US007102100B2

(12) United States Patent
Goecke et al.

(10) Patent No.: US 7,102,100 B2
(45) Date of Patent: Sep. 5, 2006

(54) METHOD USED IN GAS-SHIELDED METAL-ARC WELDING

(75) Inventors: Sven-Frithjof Goecke, Potsdam (DE); Marc Hübner, Grossbeeren (DE)

(73) Assignee: Technische Universitat Berlin, Berlin (DE)

(*) Notice: Subject to any disclaimer, the term of this patent is extended or adjusted under 35 U.S.C. 154(b) by 43 days.

(21) Appl. No.: 10/474,501

(22) PCT Filed: Apr. 22, 2002

(86) PCT No.: PCT/EP02/04416

§ 371 (c)(1),
(2), (4) Date: Mar. 26, 2004

(87) PCT Pub. No.: WO02/085565

PCT Pub. Date: Oct. 31, 2002

(65) Prior Publication Data

US 2004/0149708 A1  Aug. 5, 2004

(30) Foreign Application Priority Data

Apr. 20, 2001 (DE) ................................ 101 20 744

(51) Int. Cl.
*B23K 9/10* (2006.01)
(52) U.S. Cl. ............................ 219/137 PS; 219/130.21
(58) Field of Classification Search ............ 219/130.21, 219/130.31, 130.32, 130.33, 130.51, 137 PS
See application file for complete search history.

(56) References Cited

U.S. PATENT DOCUMENTS 4,469,933 A * 9/1984 Mizuno et al. ........ 219/130.21
4,546,234 A * 10/1985 Ogasawara et al. ..... 219/130.21
4,553,018 A * 11/1985 Kondo et al. .......... 219/130.51
4,889,969 A * 12/1989 Kawai et al. .......... 219/130.51
4,954,691 A *  9/1990 Parks et al. ............ 219/137 PS
5,003,154 A *  3/1991 Parks et al. ............ 219/130.21

FOREIGN PATENT DOCUMENTS

DE  40 29 117 A   3/1991
EP  0 769 343 A   4/1997
GB  2 242 547 A  10/1991

OTHER PUBLICATIONS

S. B. Chen et al., "Intelligent Methodology for Sensing, Modeling and Control of Pulsed GTAW Part 2—Butt Joint Welding", Welding Research Supplement, Jun. 2000, pp. 164-174.

* cited by examiner

*Primary Examiner*—Clifford C. Shaw
(74) *Attorney, Agent, or Firm*—Smith Patent Office

(57) ABSTRACT

The invention relates a method for gas-shielded metal-arc welding during the re-strike during the welding process. It is object of the invention to provide a gas-shielded metal-arc welding method to permit as low an energy intake as possible in the short-circuit phase for the arc welding. According to the invention, this object is solved by a method, characterized in that at the beginning of a short-circuit, a control is activated and remains active for the duration of the short-circuit, which increases an energy intake (phase A) when a characteristic threshold value S1 is fallen short of, and terminates the energy intake when a threshold value S2 is reached, and than lowers the energy intake (phase B).

17 Claims, 2 Drawing Sheets

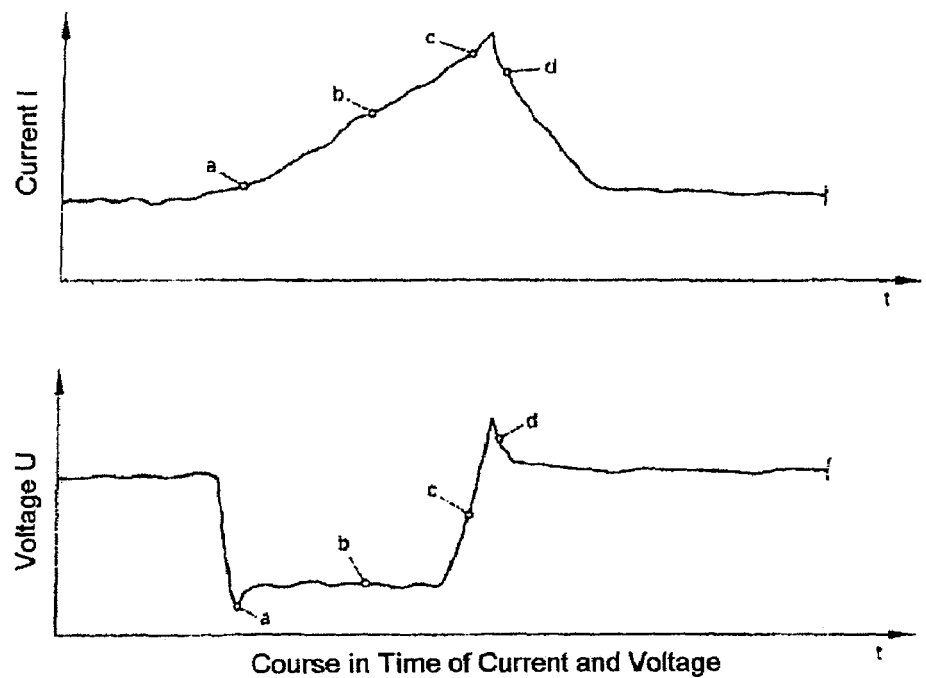
Figure 1: Schematic Current and Potential Course of a Short-circuiting Arc Welding Process (Klb)
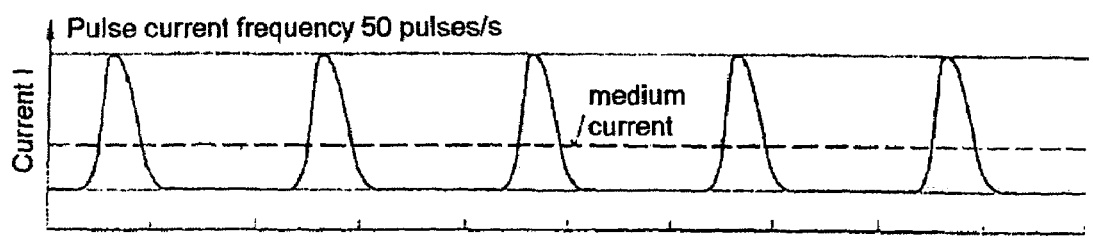
Figure 2: Schematic Current and Potential Course of a Short-circuit for Pulsed Current Welding

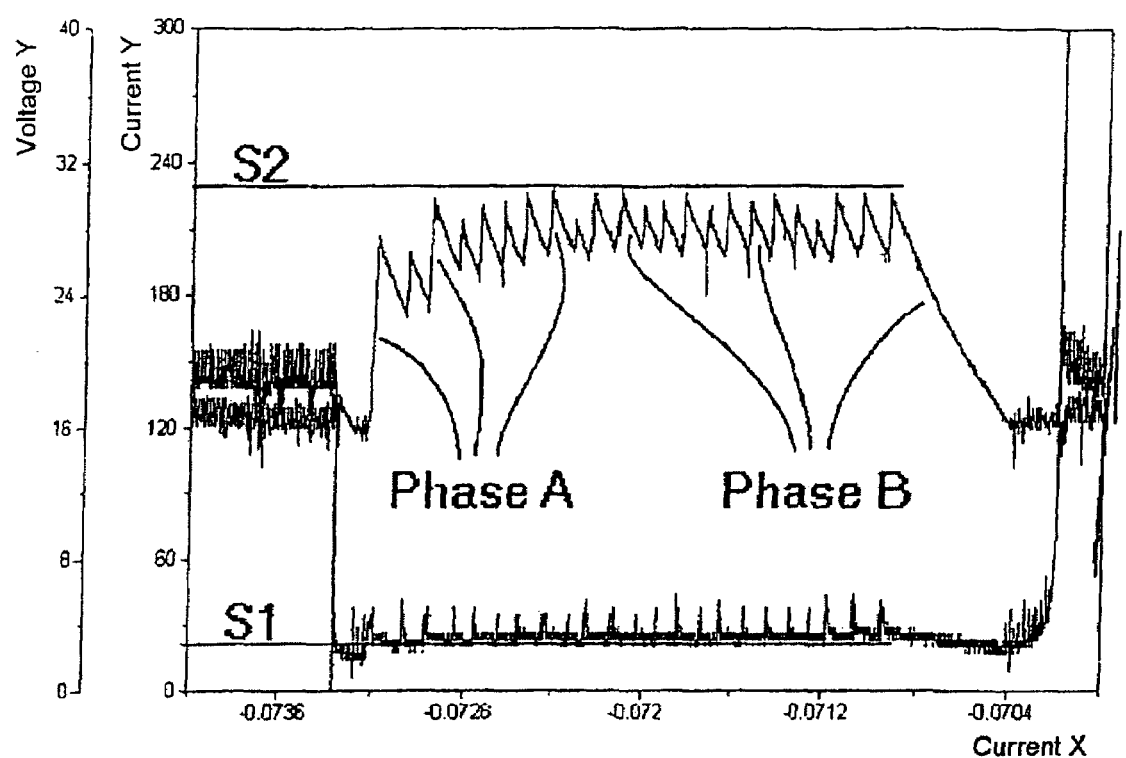
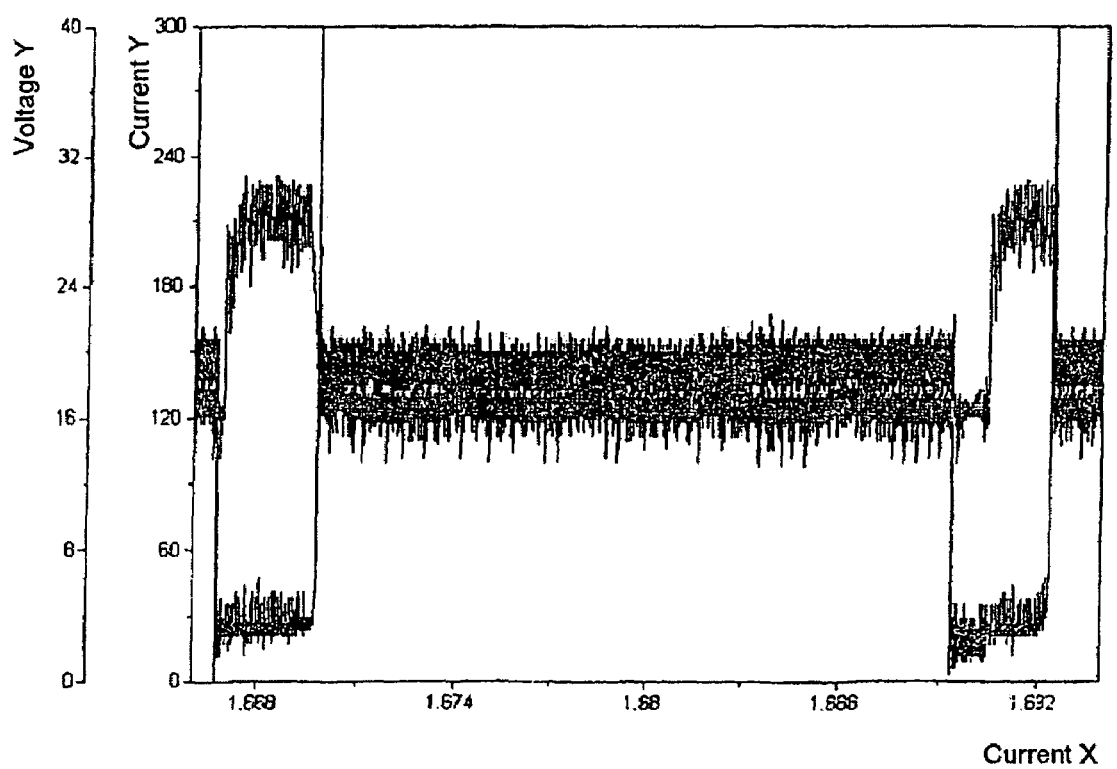
Figure 3: Current and Potential Course According to the In-vention during Short-circuit

METHOD USED IN GAS-SHIELDED METAL-ARC WELDING

The invention concerns a method used in gas-shielded metal arc welding in accordance with the preamble of patent claim 1.

Gas-shielded metal-arc welding (MSG welding) has been used for a long time for hard facing, welding or soldering of two or more pieces to be joint, made of metallic materials. In an inert gas atmosphere, the filler material in form of a wire or a band is melted in an arc created by an electric welding power source. The arc, in this case, burns between the base material and melting filler material (electrode). Depending on the inert gas used, one speaks of metal active gas welding (MAG welding) or metal inert gas welding (MIG welding). Further characteristics depend on the choice of different processing parameters. Thus one differentiates between short (circuiting) arc welding, long arc welding, spray arc welding, rotation arc welding and pulsed arc welding.

Short-circuiting arc welding (Klb welding) is characterized by an arc illumination phase and a short-circuit phase. In the arc illumination phase, a melted drop is created at the electrode end. Due to the continuous wire supply and the increasing drop volume, the drop touches the melting bath after a certain time. In this short-circuit phase, the drop is tied off by the high short-circuit current that sets in and the arc strikes again. The welding process thus changes back and forth in more or less regular intervals between two process states, wherein the material transmission takes place exclusively in the short-circuit phase.

In this cyclical welding process, stochastic fluctuations of the process parameters occur, which are caused by external disturbances and by the characteristic of the process feedback control in the machine. In this process, the short-circuit duration, and usually also the amount of current when a short-circuit breaks and the arc re-strikes, cannot be defined.

In short-circuiting arc welding processes up to date, the current continuously increases with time (dt) in the short-circuit phase according to the machine characteristics. In newer machines, different dI/dt are possible for the current rise in the short-circuit phase, sometimes with several phases. The short-circuit treatment in pulsed arc welding is similar to this. During the breaking the short-circuit and the following arc strike a substantially higher current therefore exists.

The main disadvantage of a high re-strike current is the large temperature rise of the melted bridge between the electrode wire and the melting bath, which leads to sudden breaking.

As a consequence, problems occur in the welding result, such as:
Welding splatters
Blowing out of the melt with a hole formation, in particular for thin sheets
Evaporation losses, in particular for alloy elements with high vapor pressure, such as Zn and Mg In DE 41 29 247 A1, the STT method is described, which recognizes the upcoming short-circuit breaking by a measurement of the potential gradient dU/dt. When exceeding a limit value, the current is reduced to 50 A for a few microseconds before breaking.

Disadvantages of this method are on one hand very complex signal processing of the potential measurement, which is strongly disturbed by electromagnetic fields during the welding process and therefore limits the signal sensitivity. On the other hand, the inductance of the welding energy source limits the speed of the reversal and reduction of the current so that at a high level during the breaking, a very high energy intake still takes place.

It is object of the invention to provide a metal inert gas arc welding method to permit as low an energy intake as possible in the short-circuit phase for the arc welding.

According to the invention, this task is solved by the characteristic features of claim 1. Advantageous derivatives are listed in the dependent claims.

By means of a definition of threshold values in the short-circuit phase, the properties of the welding energy source is achieved, so that on the one hand the energy intake has as low a value as possible when the short circuiting bridge breaks and the arc re-strikes and on the other hand the energy intake drops as fast as possible. Besides, the forthcoming breaking of the bridge can be recognized before it occurs.

The method according to the invention is now characterized by the fact that, at the beginning of a short-circuit, a control is activated and remains active for the duration of the short-circuit, which increases an energy intake (phase A) when a characteristic threshold value S1 is fallen short of, and terminates the energy intake when a threshold value S2 is reached, and than lowers the energy intake (phase B).

The threshold value S1 may be a voltage, and the threshold value S2 may be a voltage, a current, a resistance, a power, or any other suitable threshold value.

In a derivative of the invention, the two phases A and B repeat until the short-circuit is broken, wherein the sampling rate of the threshold values, and thus the duration of the phase, are adaptable in phase A and phase B.

The breaking of the short circuiting bridge, as well as the following strike of the arc, always take place in phase B. The energy rise in phase A and the energy drop in phase B are arbitrary in this case.

In a further embodiment of the invention, the energy rise in phase A and the energy drop in phase B are described by a polynomial, exponential, trigonometric, cyclometric or hyperbolic function.

In a further derivative of this case, the energy rise in phase A and the energy drop in phase B is described by a combination or succession of functions.

The course in time of the energy intake before and after the short-circuit is arbitrary.

In a further embodiment of the invention, the course of the energy intake before and after the short-circuit is represented by a polynomial, exponential, trigonometric, cyclometric or hyperbolic function. In a derivative, the course in time of the energy intake before and after the short-circuit can be described by a combination and/or succession of functions.

According to the invention, the transition from one to another function is triggered by a time criterion and/or by an evaluation of one or more welding process signals, wherein the process signals can be evaluated by means of a neural system.

The transition from one to another function is triggered according to the invention through a logical link of criteria.

Such a welding process signal is the welding potential, the welding current, or any process variable measurable by a sensor, wherein the process variable is a radiation, sound, an electric field or a magnetic field.

In another embodiment of the invention, the welding energy source is current-controlled, and preferably also potential, power, or resistance-controlled.

The welding energy source operates in different process phases with different controls.

The energy intake adapts itself to the course of the material transmission. It is self-regulating and is reduced to a minimum when the short-circuit breaks. The welding process becomes more uniform and smoother. Splatter creation no longer occurs.

The re-strike of the arc no longer takes place suddenly and, in particular for thin sheet welding, the melt is no longer ejected.

The evaporation of electrode material is substantially reduced.

Furthermore, very light sheet metals can be welded without problems. For surface refines sheet metals, the danger of the insufficient degassing is reduced and the melting loss of the refinement layer is very low.

Embodiments of the invention are shown in the drawings and described in detail in the following.

It is shown in

FIG. 1 a schematic current and potential course of a short-circuiting arc welding process, FIG. 2 a schematic current and potential course of a short-circuit for pulsed arc welding process, and FIG. 3 a current and potential gradient according to the invention in the short-circuit phase.

In short-circuiting arc welding in accordance with FIG. 1, a continuous change between an arc illumination phase and a short-circuit phase occurs, as is well-known. In the short-circuit phase the arc goes out and a melted fusion between the melting electrode and the melting bath on the workpiece is created. As can be seen in the current course in FIG. 1, the current continuously rises from time A, so that when breaking the short circuiting bridge and igniting the arc between c and d, a high energy intake takes place.

This also occurs occasionally during pulsed arc welding according to FIG. 2, which normally is short-circuit-free.

In FIG. 3, an embodiment of the general course of current and voltage is shown. The threshold value S1 is a voltage value, and the threshold value S2 is a current value.

What is claimed is:

1. A method used in gas-shielded metal-arc welding during the restrike during the welding process, comprising the steps of:
activating a control at a beginning of a short-circuit which remains active for the duration of the short-circuit and increasing an energy intake (phase A) when a characteristic threshold value S1 is fallen short of and terminating the energy intake when a threshold value S2 is reached, and lowering the energy intake (phase B) thereafter.

2. The method according to claim 1, further comprising the steps of selecting a voltage value as the threshold value S1 and selecting at least one of a voltage, a current, a resistance and a power value as the threshold value S2.

3. The method according to claim 1, further comprising the step of repeating both phase A and phase B until the short-circuit is broken.

4. The method according to claim 3, further comprising the step of changing the sampling rate of the threshold value, and thus the duration of phase A and phase B.

5. The method according to claim 1, further comprising the steps of always breaking the short circuiting bridge and striking the arc in phase B.

6. The method according to claim 5, further comprising the steps of raising the energy intake in phase A by an arbitrary amount and dropping the energy intake in phase B by an arbitrary amount.

7. The method according to claim 1, further comprising the step of describing the energy intake rise in phase A and the energy intake drop in phase B by at least one of a polynominal, exponential, trigonometric, cyclometric and hyperbolic function.

8. The method according to claim 7, further comprising the step of describing the energy intake rise in phase A and the energy intake drop in phase B by at least one of a combination and a succession of functions.

9. The method according to claim 1, further comprising the step of adjusting the energy intake before and after the short-circuit to be an arbitrary function of time.

10. The method according to claim 9, wherein said step of adjusting the energy intake before and after the short-circuit includes using at least one of a polynomial, exponential, trigonometric, cyclometric, and hyperbolic function.

11. The method according to claim 1, further comprising the step of adjusting the energy intake before and after the short-circuit by using at least one of a combination and succession of functions.

12. The method according to claim 11, further comprising the step of triggering the transition from one function to another function by at least one of a time criterion and an evaluation of at least one of the welding process signals.

13. The method according to claim 1, further comprising the step of selecting at least one of a welding potential, a welding current, and any process variable measurable by a sensor for such a welding process signal.

14. The method according to claim 13, wherein said step of selecting any process variables includes selecting the process variable from at least one of a radiation property, a sound property, an electric field property, and a magnetic field property.

15. The method according to claim 1, further comprising the step of current-controlling a welding energy source.

16. The method according to claim 15, further comprising the step of selecting the welding energy source from at least one of a potential source, a power source, and a resistance-controlled source.

17. The method according to claim 1, further comprising the step of regulating a welding energy source in different process phases with different controls.

* * * * *